United States Patent Office.

IMPROVED METHOD OF DEFECATING CANE JUICE.

LAWRENCE REID, OF NEW YORK, N. Y., AND DAVID LYMAN, OF MIDDLEFIELD, CONNECTICUT, ADMINISTRATOR OF THE ESTATE OF EDWARD H. SWIFT, DECEASED, ASSIGNORS TO PHINEAS L. ROBINSON AND JOSEPH H. PARSONS.

Letters Patent No. 60,245, dated December 4, 1866; antedated November 29, 1866.

SPECIFICATION.

TO ALL WHOM IT MAY CONCERN:

Be it known that we, LAWRENCE REID, of New York city, in the county and State of New York, and DAVID LYMAN, of Middlefield, in the county of Middlesex, in the State of Connecticut, administrator on the estate of EDWARD H. SWIFT, deceased, do hereby declare that the said REID and the said SWIFT were joint inventors of a certain new and useful chemical compound for Defecating Cane Juice, and we do hereby declare that the following is a full and exact description of the best mode of manufacturing the same.

This compound is a slightly alkaline phosphate of lime. It is intended to be introduced as a final step in the defecation of sugar-cane juice to correct any slight acidity which may be generated in the juice, and to promote the crystallization of the sugar.

Into a barrel of sufficient size, place twenty pounds of slaked lime, then add twenty gallons of water slowly, stirring well the lime during the addition of the water. Let it settle for one-half hour, then with a pail or other vessel take one-half of the lime and water from the top of the barrel and put it aside. To the remaining lime and water in the barrel add about fifteen pounds of the superphosphate of lime, or as much as will make the lime and water in the barrel freely acid, tinging blue litmus paper bright red. The superphosphate of lime is prepared by the action of dilute sulphuric acid upon bone dust, in the usual manner. Be particular to stir this mixture of lime and water and the superphosphate of lime well. Having brought it into an acid state, as indicated by the litmus paper, we proceed to add to the acid preparation in the barrel the remainder of the lime water which we had taken out of the barrel, adding alternately more acid or lime according as we produce an alkaline or acid reaction as indicated by test paper. When we have added within one-half gallon of the last portion of lime, we carefully bring the mixture into a neutral state, as indicated by test paper. When this is effected we add the remaining half gallon of lime and water, and stir the mixture. It should turn weak turmeric paper brown. It is then finished and fit for use.

We prefer to prepare each day only as much as may be wanted for the operations of that day, so as to have it in a state of the most minute division. This is a phosphate of lime that contains lime in a semi-free state, but not so as to act as a caustic lime; hence it possesses neutralizing powers when heated with the cane juice, without injuring the color of the sugar, and contributes greatly to the production of a sound sirup to crystallize from.

Considerable heat is eliminated when the acid phosphate is added to the lime, and this insures the complete neutralization of any rough, heavy particles of lime which may have settled down in the barrel, and for this object the process is so arranged as to insure that a neutral phosphate is formed, with no large quantity of free lime, which might be afterwards developed in the boiling and injure the sirup.

Having now fully described this invention, what we claim as new, and as the invention of the said LAWRENCE REID and EDWARD H. SWIFT, deceased, and desire to secure by Letters Patent, is as follows:

We claim the within-described chemical compound, adapted for use in the defecation of sugar-cane juice, substantially as and for the purpose herein set forth.

LAWRENCE REID,
DAVID LYMAN.

Witnesses:
D. W. STETSON,
D. L. FREEBORN, } to L. R.

H. WOODWARD,
LYMAN A. MILLS, } to D. L.